United States Patent [19]

Okada et al.

[11] Patent Number: 4,757,272
[45] Date of Patent: Jul. 12, 1988

[54] FOUR PHASE PSK DEMODULATOR

[75] Inventors: Yukihiro Okada, Osaka; Yuichi Ninomiya, Tokyo; Yoshimichi Ohtsuka, Tokyo; Yoshinori Izumi, Tokyo; Sei'ichi Goushi, Tokyo, all of Japan

[73] Assignees: NEC Home Electronics Ltd., Osaka; Nippon Hoso Kyokai, Tokyo, both of Japan

[21] Appl. No.: 880,836

[22] Filed: Jul. 1, 1986

[30] Foreign Application Priority Data

Jul. 9, 1985 [JP] Japan ................................ 60-149336

[51] Int. Cl.$^4$ .................... H03D 3/18; H03D 3/24; H03K 9/04; H04L 7/04
[52] U.S. Cl. .................................... 329/50; 329/107; 329/110; 329/124; 375/80; 375/111; 375/120
[58] Field of Search .................. 329/50, 104, 105, 107, 329/110, 122, 124; 375/80, 111, 120; 455/214, 337

[56] References Cited

U.S. PATENT DOCUMENTS

| 4,361,894 | 11/1982 | Kurihara et al. | 329/110 X |
| 4,409,562 | 10/1983 | Kurihara | 329/50 X |
| 4,525,676 | 6/1985 | Atobe et al. | 329/136 X |
| 4,585,998 | 4/1986 | Veillard | 329/50 |
| 4,591,797 | 5/1986 | Tanimoto et al. | 329/50 |

OTHER PUBLICATIONS

IEEE Transactions on Communications, vol. COM-20, No. 4, Aug. 1972, "Carrier Synchronizer for Coherent Detection of High-Speed...", by Yamamoto, et al., pp. 803–807.
IEEE Transactions on Communications, vol. Com-24, No. 8, Aug. 1976, "MSK and Offset QPSK Modulation", by Steven A. Gronemeyer & Alan L. McBride, pp. 809–820.
"An Investigation of a Differently Coherent Detector for Reception of QPSK Signals", by J. Y. Huang, pp. 27.1.1–27.1.6.

Primary Examiner—Gene Wan
Assistant Examiner—David Mis
Attorney, Agent, or Firm—Cushman, Darby & Cushman

[57] ABSTRACT

A demodulator for regenerating and demodulating a carrier signal from a four-phase PSK received signal having a data symbol preamble and a fixed phase (one of four phases) of a particular time width using a synchronous detection type demodulating system (remodulation type demodulating system). The demodulator includes an orthogonal demodulating circuit and a remodulating circuit for regenerating a carrier signal which is the data signal during a preamble transmission period from a received modulated signal. The remodulating circuit includes a demodulator having an AFC circuit for detecting a frequency change using a narrow band filter, means for suppressing frequency changes of the four-phase PSK modulated signal received and means for rendering constant the frequency of the regenerated carrier signal passing through the narrow band filter.

5 Claims, 3 Drawing Sheets

FOUR PHASE PSK DEMODULATOR

BACKGROUND OF THE INVENTION

This invention relates generally to phase demodulators. Specifically, the invention provides a synchronous demodulator for demodulating a four-phase PSK modulated signal on a microwave frequency band. The invention is appropriate for use in communication and broadcasting.

In signal transmission represented by satellite communication and satellite broadcasting on the microwave frequency band, a RFTDM (Radio Frequency Time Division Multiplex) system for transmitting data and various kinds of signals by processing high frequency signals on a time division multiplex basis has recently come into use. There is in use by NHK (Japan Broadcasting Corporation), a high-definition television broadcasting system using a technique known as MUSE (Multiplex Sub-Nyquist Sampling Encoding). This four-phase PSK demodulating system provides increased occupied bandwidth and transmission efficiency.

When a receiver demodulates a four-phase PSK modulated signal upon receiving such a high frequency signal, multistage frequency converter circuits are arranged so as to convert the signal into an intermediate frequency (IF) signal and supply the IF signal to a demodulator. A synchronous demodulating system for regenerating a carrier signal from the four-phase PSK demodulated signal received and demodulating the modulated data using the regenerated carrier signal is usually used for the four-phase PSK demodulator. However, the carrier signal must be regenerated sufficiently rapidly relative to the four-phase PSK modulated signal transmitted in the form of a burst, as shown in FIG. 1, to establish the phasing of the carrier signals within a preamble period. The preamble period is one during which a fixed symbol is used to phase modulate before the actual data to be transmitted is used to phase modulate. For example, a symbol such as (00) may be sent for a period longer than that in the case of a normal symbol.

In the high velocity carrier signal regenerating system, there is generally used a reverse modulating or four-multiple system. The reverse modulating system is advantageous when the frequency of the input carrier signal is high.

FIG. 2 is a block diagram of an example of a carrier regenerating demodulating circuit employing a reverse modulating system. This circuit includes an orthogonal phase demodulating circuit 401, a remodulating circuit 402 and a narrow-band filter circuit 403 forming a carrier signal regenerating loop. The four-phase modulated signal "a" supplied at terminal 301 is demodulated by the orthogonal phase demodulating circuit 401 using regenerated carrier signals "f" and "g". Many unnecessary and undesirable components (in addition to the demodulated signals) are produced by multipliers 302, 303 so the demodulated signals "h" and "i" are passed through low pass filters 305, 306 to remove such undesirable components before being further supplied to limiter circuits 307, 308 and then to the remodulating circuit 402.

In remodulating circuit 402, demodulated signals "h" and "i" and input signals "m" and "l" are multiplied by multipliers 309, 310 and are then added by an adder 312, to obtain a carrier signal "n" containing no modulated component. The carrier signal "n" is passed through a narrow-band filter 313 to improve its S/N ratio. It is then supplied to a limiter circuit 314 to remove amplitude changes. Limiter 314 is coupled to the input of a variable phase shifter 315 which provides signal "g" for use in the orthogonal phase demodulating circuit 401. Phase shifters 304 and 311 are used to provide a delay of $\pi/2$.

The signal in each portion of the circuit of FIG. 2 will be further described with the aid of numerical expressions to describe the regeneration action of the carrier signal. Assuming that the four-phase PSK modulated signal "a" supplied at input terminal 301 is expressed by(:)

$$a = I \cos wt + Q \sin wt$$

(where I, Q=constants having positive and negative values and $|I|=|Q|$) and that the reference signals "f", "g" in the orthogonal phase demodulating circuit 401 have a phase error of $\psi_1$, the following relationships exist:

$$f = -K_1 \cos(wt - \psi_1)$$

$$g = K_1 \sin(wt - \psi_1).$$

Assuming the gains of the multipliers 302, 303 are represented by $K_2$, the output signals "b" and "c" of the multipliers 302, 303 will become as follows:

$$\begin{aligned} b &= (I \cos wt + Q \sin wt) \cdot (-K_1 \cos(wt - \phi_1)) \cdot K_2 \\ &= \{-(K_1 Q/2) \sin 2wt \cdot \cos \phi_1 - (K_1 I/2) \sin 2wt \cdot \sin \phi_1 \\ &\quad (K_1 Q/2) \sin \phi_1 + [K_1 Q/2] \cos 2wt \cdot \sin \phi_1 - (K_1 I/2) \cos \phi_1 - \\ &\quad (K_1 I/2) \cos 2wt \cdot \cos \phi_1 - (K_1 I/2) \sin 2wt \cdot \sin \phi_1\} \cdot K_2 \end{aligned}$$

$$\begin{aligned} c &= (I \cos wt + Q \sin wt) \cdot K_1 \sin(wt - \phi_1) \\ &= \{(K_1 Q/2) \cos \phi_1 - (K_1 Q/2) \cdot \cos 2wt \cdot \cos \phi_1 - \\ &\quad (K_1 Q/2) \sin 2wt \cdot \sin \phi_1 + (K_1 I/2) \sin 2wt \cdot \\ &\quad \cos \phi_1 - (K_1 I/2) \sin \phi_1 - (K_1 I/2) \cos 2wt \cdot \sin \phi_1\} \cdot K_2 \end{aligned}$$

When the signals "b", "c" are supplied to the low pass filters 305, 306, given the gain of the filter is $K_3$, output signals "d", "e" thereof become(:)

$$d = -K_4 Q \sin \psi_1 - K_4 I \cos \psi_1$$

$$e = K_4 Q \cos \psi_1 - K_4 I \sin \psi_1$$

(where $K_1, K_2, K_3/2 = K_4$.)

When the signals "d", "e" are supplied to the limiter circuits 307, 308, the output signals "h", "i" of the limiter circuits 307, 308 become $$h = -K_5 I$$

$$i = K_5 Q$$

(where $K_5$=constant of the limiter circuit), and the values of the signals "h", "i" also become constant when $\psi_1$ is small. Subsequently, the signals "h", "i" are supplied to the remodulating circuit 402 and multiplied by signals "l", "m". A delay circuit 316 compensates for the delays of the demodulated signals "h", "i" received by the multipliers 309, 310 from the multipliers 302, 303, respectively. Assuming that the delays (phase changes) are $\psi_2$, the signals "l", "m" are expressed by $$l = I \cos(wt - \psi_2) + Q \sin(wt - \psi_2)$$

$$m = -Q \cos(wt - \psi_2) + I \sin(wt - \psi_2)$$

(where the gains of the delay circuit 316 and the phase shifter 311 are set as 1 for brevity).

Accordingly, the output signals "j" and "k" of the multipliers 309, 310 become as follows when the gains thereof are set at $K_6$(:)

$$j = IQK_7 \cos(wt - \psi_2) - I^2 K_7 \sin(wt - \psi_2)$$

$$k = IQK_7 \cos(wt - \psi_2) + Q^2 K_7 \sin(wt - \psi_2)$$

(where $K_7 = K_4 = K_5 \cdot K_6$).

When the gain of the adder 312 is set at 1, the output signal n thereof is expressed by(:)

$$n = (I^2 + Q^2) \cdot K_7 \sin(wt - \psi_2) = K_8 \sin(wt - \psi_2)$$

(where $K_8 = (I^2 + Q^2) \cdot K_7$ = constant), which is processed by narrow band filter 313, the limiter circuit 314 and variable phase shifter 315 to become reference signals "f", "g" of the orthogonal demodulating circuit 401. The variable shifter 315 is used to adjust the phase and gain so that the output signal "g" may become K·sin wt. The carrier signal is thus regenerated.

The four-phase PSK modulated signal (hereinafter referred to as the signal received) supplied to the demodulator thus constructed is, as set forth above, the intermediate frequency signal subjected to frequency conversion by multi-stage frequency converter circuits from the microwave frequency band. Its frequency stability depends on the stability of a local oscillator in the frequency converter circuits. When the input signal frequency fluctuates in the four-phase PSK demodulator, however, the frequency of the regenerated carrier signal "n" passed through the narrow-band filter 313 is also fluctuated and there is thus produced the difference in phase between the input signal "n" and output signal "o" of filter 313. Consequently, the phase of the regenerated signal "g" becomes ambiguous.

Although it may be attempted to stabilize the frequency of the intermediate frequency signal by using a crystal oscillation circuit in the local oscillation circuit, that arrangement is disadvantageous in view of circuit arrangement and production cost.

An additional disadvantage is that, because the carrier signal frequency of the demodulator normally becomes high when the data transmission rate is high, it becomes difficult to design and construct narrow-band filter 313, limiter circuit 314 and the like.

SUMMARY OF THE INVENTION

An object of the present invention is to provide a demodulator for regenerating a carrier signal from a four-phase PSK modulated signal received and demodulating the regenerated carrier signal. More specifically, it is an object of this invention to provide a demodulator capable of properly demodulating the regenerated carrier signal by preventing the phase fluctuation of the regenerated carrier signal caused by its frequency fluctuation when it is passed through a narrow-band filter.

The four-phase PSK modulated signal according to the present invention includes a fixed symbol preamble phase modulated signal. The regenerated signal is placed in a synchronous state during the preamble period.

The four-phase PSK demodulator according to the present invention includes orthogonal phase demodulating means for receiving a signal and demodulating the signal received using a reference regenerated carrier signal and remodulating means for receiving the output of the orthogonal phase demodulating means through a gate circuit and regenerating a carrier signal from the signal received. A closed loop is formed with AFC means for receiving the regenerated carrier signal and supplying the reference regenerated carrier signal to the orthogonal phase demodulating means, wherein the loop is opened by the gate circuit during the preamble period and wherein a fixed symbol signal is supplied to the remodulating means.

The AFC means includes a frequency converter circuit for lowering the frequency of the input signal, a narrow-band filter for passing the converted signal therethrough, a frequency converter circuit for again raising and generating the frequency, a voltage control oscillator for supplying locally produced common signals to both frequency converter circuits, and a phase comparator for detecting the phase difference across both ends of the narrow-band filter. The frequency of the converted signal passing through the narrow band filter is made constant by applying the output of the phase comparator to the voltage control oscillator through a low-pass filter and controlling the frequency of the output thereof.

If the frequency of the received signal changes and thus causes the frequency of the regenerated carrier signal received by the AFC means to change, the frequency of the signal passing through the narrow-band filter of the AFC means will be shifted from the central frequency.

Consequently, there is produced the difference in phase between the input and output signals of the filter. However, the frequency of the voltage control oscillator varies with the phase difference according to the present apparatus and the frequency of the output signal of the frequency converter circuit, i.e., the signal passing through the narrow band filter is always maintained in the center of the filter and made free from the phase difference. The output signal of the AFC means is equal to the frequency of the original input signal. The reference regenerated carrier signal supplied to the orthogonal demodulating means through the AFC means is always kept in a proper relation to the signal received even if the frequency of the signal received by the demodulator fluctuates. Moreover, the fixed symbol signal is supplied by the gate circuit to the remodulating means during the preamble period, and the AFC means is stably locked in phase during the preamble period.

BRIEF DESCRIPTION OF THE DRAWINGS

One presently preferred embodiment of the invention will be described with reference to the drawings forming a part of this application. Throughout the drawings, like reference numerals designate like or corresponding parts.

DETAILED DESCRIPTION OF THE PREFERRED EMBODIMENT

The following is a detailed description of one presently preferred embodiment of the invention. The specific embodiment constitutes the best mode known to the inventor at the time of the filing of this application for practicing the invention. The description of this invention, as set forth in this application including all of its parts, is intended to enable one of ordinary skill in the art to which this invention pertains to practice the invention.

Figure 4:
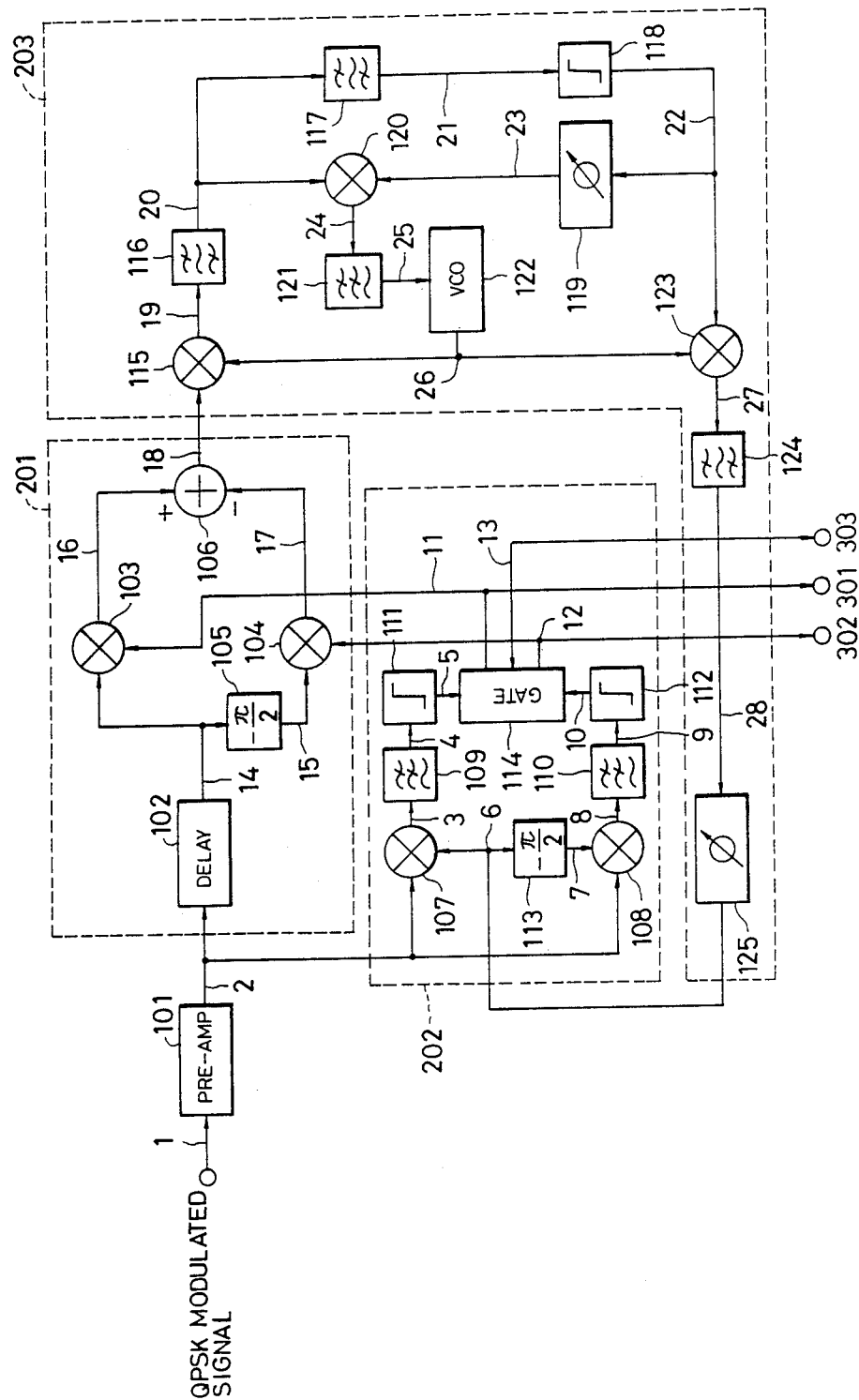
FIG. 4 is a block diagram of the PSK demodulating system according to the invention.

FIG. 4 is a block diagram of the demodulator according to the present invention. It includes a remodulating means 201, an orthogonal phase demodulating means 202 and an AFC means 203. A received four-phase PSK modulated signal 1 is supplied to the remodulating means 201 and the orthogonal phase demodulating means 202 through a preamplifier 101 to provide a preamplified signal 2.

Signals 11, 12 demodulated by the orthogonal demodulating means 202 are supplied to the remodulating means 201, which generates a carrier signal 18. Regenerated carrier signal 18 is supplied as a reference regenerated carrier signal 6 of the orthogonal phase demodulating means 202 through AFC means 203 and is used to form a loop. Demodulated signals 11, 12 are provided at output terminals 301, 302.

Orthogonal phase demodulating means 202 comprises multipliers 107, 108, limiter circuits 111, 112 and a gate circuit 114. The demodulating means 202 is formed as two branch lines. Input signal 2 from preamplifier 101 is subjected to orthogonal phase modulation by multiplying the reference regenerated carrier signal 6 and a signal 7 shaped into an orthogonal differential phase by a $\pi/2$ phase shifter 113, whereby demodulated signals 3, 8 are obtained in the branch lines, respectively. Undesirable signal components resulting from the multiplication of demodulated signals 3, 8 are eliminated by low pass filters 109, 110. The respective amplitudes of the filtered signals on lines 4, 9 are limited by limiter circuits 111, 112 before demodulated signals 5, 10 are supplied to the gate circuit 114.

Since the fixed symbol preamble is arranged in front of the four-phase PSK modulated signal, gate circuit 114 is supplied by an input terminal 303 with a gate pulse signal 13 having a time width equivalent to the preamble period and used to obtain the regenerated carrier signal, provided that no phase ambiguity exists during the period.

The carrier signal regenerating loop during the preamble period temporarily becomes an open loop, whereas the gate circuit 114 is supplied with a signal equivalent to the fixed symbol. The phase loop of the AFC means 203 is locked so as to establish the phase of the regenerated carrier signal. The demodulated signals 11, 12 controlled by gate circuit 114 are supplied to the output terminals 301, 302 as the four-phase PSK demodulated signals and also are supplied to the remodulating means 201.

Remodulating means 201 comprises a delay circuit 102, a $-\pi/2$ phase shifter 105, multipliers 103, 104 and an adder 106. Demodulated signals 11, 12 are supplied respectively to multipliers 103, 104 and respectively multiplied by a signal 14 received through the delay circuit 102 and a signal 15 from the $-\pi/2$ phase shifter 105. Output signals 16, 17 of the multipliers 103, 104 are added in adder 106 so as to become a regenerated carrier signal 18 without containing modulated components. Carrier signal 18 is supplied to the AFC means in the following stage.

AFC means 203 comprises multipliers 115, 123, 120, band pass filters 116, 124, a narrow-band filter 117, a limiter 118, variable phase shifters 119, 125, a low pass filter 121 and a voltage controlled oscillator 122. The AFC means forms a kind of phase locked loop (PLL). The regenerated carrier signal 18 and a signal 26 supplied by the voltage controlled oscillator 122 are multiplied in the multiplier 115 for frequency conversion to form signal 19 which is then passed through the band pass filter 116 so that the unnecessary components produced thereby may be removed. The frequency of the AFC loop is set low so that the circuit consisting of the narrow band filter 117 and the limiter 118 and the like is readily realizable. Given a frequency of $f_1$ of the regenerated carrier signal 18, an oscillating frequency of $f_0$ of the voltage control oscillator 122 and a frequency of $f_2$ of the AFC loop, the following relation exists:

$$f_2 = f_1 - f_0$$

The filtered signal 22 of the AFC loop and the output signal 26 of the voltage controlled oscillator 122 are multiplied in the multiplier 123 to form signal 27 for frequency conversion and, given a frequency f1 of the output signal 28 of the band pass filter 124, the frequency conversion is carried out to satisfy the relation(:)

$$f_3 = f_2 + f_0$$

Accordingly, $f_3 = f_1$, is obtained from the above equation, and the regenerated carrier signal becomes equal in frequency to the output signal 28 and thus need not rely on the oscillating frequency of the voltage controlled oscillator 122.

The output signal 20 of the band pass filter 116 is supplied to the multiplier 120 and the narrow band filter 117. The output signal 21 of the narrow band filter 117 whose amplitude is limited by the limiter circuit 118 is supplied to the variable phase shifter 119 and the multiplier 123. The multiplier 120 is used to compare the signal 20 and the output signal 23 of the variable phase shifter 119 in terms of phase, and the output signal 24 thereof is supplied to the voltage control oscillator 122 through the low pass filter 121 to form signal 25 which controls the oscillating frequency. The variable phase shifter 119 is thus employed to set the central frequency of the narrow-band filter 117 as the frequency of the AFC loop.

Figure 1:
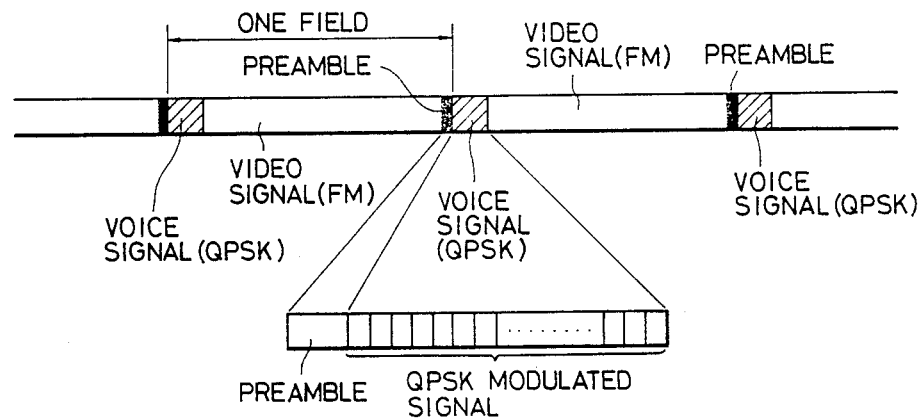
FIG. 1 is a diagram illustrating the signal structure to which the present invention is applicable.
Figure 3:
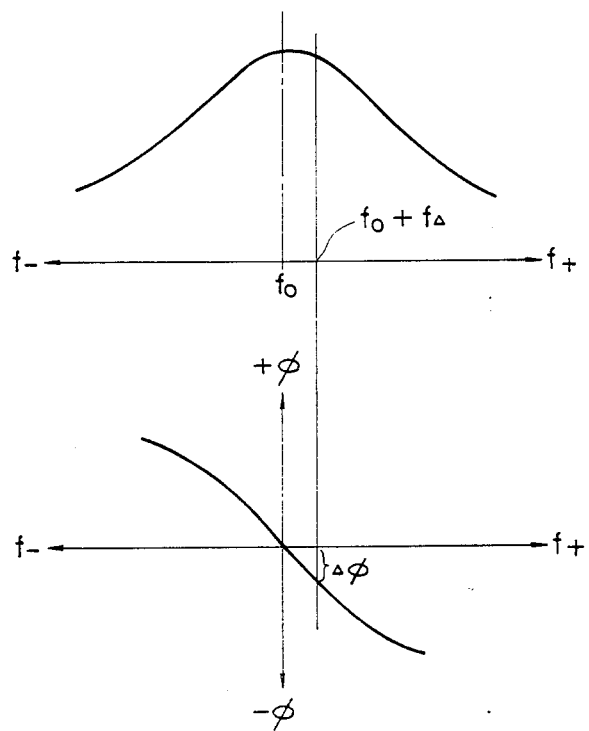
FIG. 3 is a graph representation of characteristics of a narrow band filter used in regenerating a carrier signal.
Figure 2:
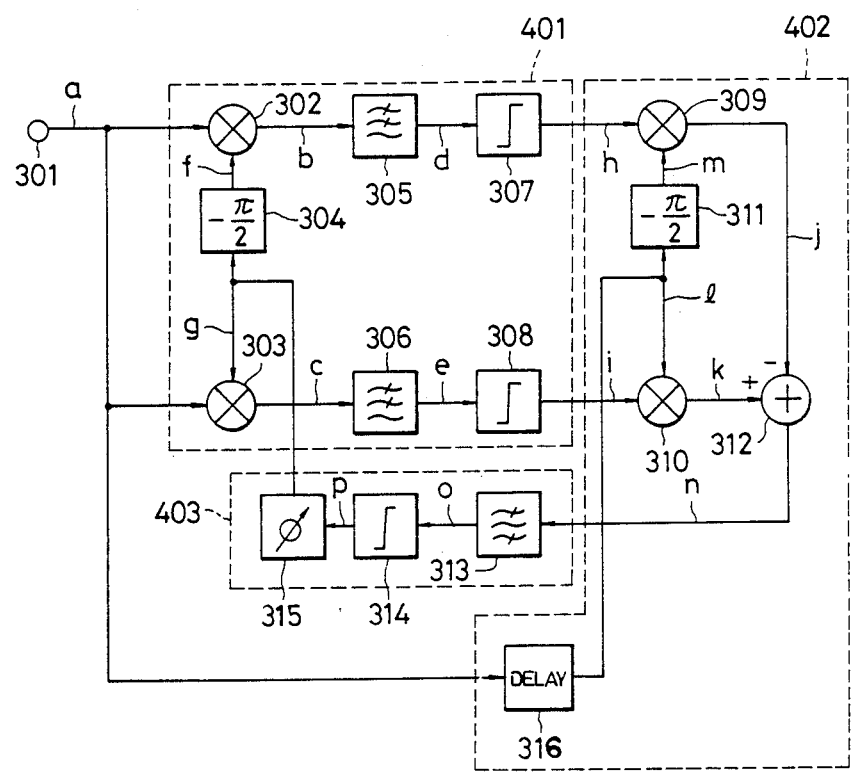
FIG. 2 is a schematic diagram showing an RFTDM signal transmission system of the prior art.

FIG. 3 illustrates a phase difference generation mode when the frequency of the signal passing through the narrow-band filter 117 having characteristics necessary for the improvement of S/N is shifted from the central frequency of the filter. Phase fluctuation of the AFC loop is thus prevented because the frequency of the signal passing through the narrow-band filter 117, i.e., the frequency of the AFC loop, can be made constant. Moreover, the second variable phase shifter 125 is used to adjust the phase of the output signal of the band pass filter 124 so that the output signals thereof may become the reference signal of the orthogonal demodulating means 202 and be produced as the reference regenerated carrier signal 6.

The oscillating frequency of the voltage controlled oscillator 12200 for providing the local generated signals of the frequency converters is controlled so as to set the regenerated carrier signal obtained from the remodulating means through the reverse conversion method and subjected to frequency conversion in the AFC means including the phase lock loop at the central frequency of the narrow band filter properly at all times. Consequently, no phase difference is generated by the narrow-band filter and, even if the four-phase PSK modulated signal received fluctuates, the reference regenerated carrier signal in a proper phase relation can be supplied to the orthogonal demodulating means. Moreover, the narrow-band filter and the limiter circuit are readily designed because the frequency is reduced by the AFC means.

Although the present invention has been described with reference to preferred embodiments, numerous modifications and rearrangements can be made, and still the result will come within the scope of the invention.

We claim:

1. A demodulator for demodulating a four-phase PSK modulated signal having a data symbol preamble and having a fixed phase (one of the four phases) of a particular time width, comprising:
   an orthogonal demodulating circuit; and
   a remodulating circuit for regenerating the carrier signal from a four-phase PSK modulated signal received by fixing said data symbol as the received modulated signal from which the carrier signal is to be regenerated by the remodulating circuit during a preamble transmission period using a gate circuit.

2. A demodulator for regenerating a carrier signal from a four-phase PSK modulated received signal having a data symbol preamble and a fixed phase (one of the four phases) of a particular time width using a synchronous detection type demodulating system (remodulation type demodulating system), comprising:
   an orthogonal demodulating circuit; and
   a remodulating circuit for regenerating the carrier signal from the received four-phase PSK modulated signal, the remodulating circuit including an AFC circuit for detecting a frequency change in said received four-phase PSK modulated signal using a narrow band filter and means for suppressing such frequency changes and rendering constant the frequency of the signal outputted by the narrow band filter, wherein said data symbol is fixed as the received modulated signal from which the carrier signal is to be regenerated during a preamble transmission period using a gate circuit.

3. A demodulator for demodulating a received four-phase PSK modulated signal having a data symbol preamble and a fixed phase (one of four phases) of a particular time width, comprising:
   a synchronous detection type demodulating apparatus for regenerating a carrier signal by four-phase multiplication of said received four-phase PSK modulated signal; and
   an AFC circuit operating so as to detect a frequency change in said received four-phase PSK modulated signal using a narrow band filter so as to suppress detected frequency changes of the four-phase PSK modulated signal received, and so as to make constant the frequency of the signal outputted by the narrow band filter, wherein said data signal is fixed as the received modulated signal from which the carrier signal is to be regenerated during a preamble transmission period using a gate circuit.

4. A synchronous detection type demodulator for regenerating a carrier signal from a four-phase PSK modulated signal having a data symbol preamble and a fixed phase (one of four phases) of a particular time width received by said demodulator by converting the regenerated carrier signal into a particular frequency using an AFC circuit and by changing the frequency of the signal passing through a narrow band filter contained in the AFC circuit from the frequency of the received four-phase PSK modulated signal, wherein the data signal is fixed as the received modulated signal from which the carrier signal is to be regenerated during a preamble transmission period using a gate circuit.

5. A synchronous detection type four-phase PSK demodulator for regenerating a carrier signal from a four-phase PSK modulated signal having a data symbol preamble and a fixed phase (one of four phases) of a particular time width, the demodulator including a pair of frequency converters, the first frequency converter for converting the frequency of said regenerated carrier signal to a particular frequency, the second frequency converter for reconverting the frequency to the original frequency, and a narrow band filter coupled between the first and second frequency converters for detecting a frequency change in the received four-phase PSK modulated signal, wherein the data signal is fixed as the received modulated signal from which the carrier signal is to be regenerated during a preamble transmission period using a gate circuit.

* * * * *